(12) United States Patent
Paleczek

(10) Patent No.: US 12,473,911 B2
(45) Date of Patent: Nov. 18, 2025

(54) MOTOR-PUMP UNIT FOR USE IN A MOTOR VEHICLE

(71) Applicant: Dr. Ing. h.c. F. Porsche Aktiengesellschaft, Stuttgart (DE)

(72) Inventor: Josef Paleczek, Tiefenbronn (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 18/673,679

(22) Filed: May 24, 2024

(65) Prior Publication Data

US 2025/0059968 A1    Feb. 20, 2025

(30) Foreign Application Priority Data

Aug. 18, 2023 (DE) .................. 10 2023 122 138.8

(51) Int. Cl.
F04B 53/16 (2006.01)
F04B 17/03 (2006.01)
F04B 53/00 (2006.01)

(52) U.S. Cl.
CPC .............. F04B 53/16 (2013.01); F04B 17/03 (2013.01); F04B 53/003 (2013.01)

(58) Field of Classification Search
CPC .......... F04C 15/06; F04C 2/084; F04C 2/086; F04C 2/14; F04C 2/18; F04C 2240/30; F04C 2240/50; F04C 2240/603; F04B 17/03; F04B 53/003; F04B 53/16
See application file for complete search history.

(56) References Cited

U.S. PATENT DOCUMENTS

| | | | | |
|---|---|---|---|---|
| 4,325,567 A * | 4/1982 | Hendrickson | ........ | B60G 17/044 280/DIG. 1 |
| 5,031,403 A * | 7/1991 | Okada | .................. | B60K 17/105 74/606 R |
| 5,924,712 A * | 7/1999 | Pierce | .................. | B60G 21/055 280/124.13 |
| 6,179,595 B1 * | 1/2001 | Buchmuller | ........ | F04C 15/0061 418/104 |
| 6,457,546 B1 * | 10/2002 | Ishimaru | .............. | A01D 69/002 60/487 |
| 7,316,287 B2 * | 1/2008 | Ohashi | .................... | F04B 53/04 180/6.3 |

(Continued)

FOREIGN PATENT DOCUMENTS

DE         10158210 A1    6/2002
DE    102004063538 A1    7/2006
(Continued)

OTHER PUBLICATIONS

German Examination Report issued Aug. 19, 2024, by the German Patent and Trademark Office in corresponding German Application No. 10 2023 122 138.8 with an English translation. (22 pages).

*Primary Examiner* — Jesse S Bogue
(74) *Attorney, Agent, or Firm* — Buchanan Ingersoll & Rooney PC

(57) ABSTRACT

A motor-pump unit for use in a motor vehicle includes a hydraulic pump for generating hydraulic pressure for driving hydraulic systems, a bearing tube for mounting the motor-pump unit inside the motor vehicle and at least one retainer for fastening the motor-pump unit to an axle carrier of the motor vehicle. The retainer is arranged at the end of the hydraulic pump.

15 Claims, 6 Drawing Sheets

(56) References Cited

U.S. PATENT DOCUMENTS

| | | | |
|---|---|---|---|
| 8,991,840 B2* | 3/2015 | Zuleger | B60G 13/06 |
| | | | 280/124.16 |
| 9,181,048 B1* | 11/2015 | Rash | B66F 9/18 |
| 10,167,937 B2* | 1/2019 | Crosby | F15B 11/028 |
| 10,300,905 B2* | 5/2019 | Holmes | F16H 48/10 |
| 10,502,302 B2* | 12/2019 | Saravani | F16H 48/38 |
| 12,090,807 B2* | 9/2024 | Mangelschots | F16F 9/466 |
| 2002/0066327 A1 | 6/2002 | Nagai et al. | |
| 2003/0070429 A1* | 4/2003 | Jolliff | B60K 17/105 |
| | | | 60/487 |
| 2007/0182245 A1* | 8/2007 | DuCharme | B60K 7/0015 |
| | | | 303/152 |
| 2010/0071985 A1* | 3/2010 | Harada | B60T 8/3685 |
| | | | 180/219 |
| 2014/0265170 A1* | 9/2014 | Giovanardi | F16K 11/065 |
| | | | 280/5.5 |
| 2020/0355202 A1* | 11/2020 | Lauterbach | B60G 9/02 |
| 2021/0078379 A1 | 3/2021 | Albl et al. | |
| 2023/0242183 A1 | 8/2023 | Juengling et al. | |

FOREIGN PATENT DOCUMENTS

| | | | |
|---|---|---|---|
| DE | 102009023871 B4 | 5/2011 | |
| DE | 19923851 B4 | 3/2012 | |
| DE | 102011016624 A1 | 10/2012 | |
| DE | 102013216881 A1 | 2/2015 | |
| DE | 102013017270 A1 * | 7/2017 | B60J 7/0015 |
| DE | 102017223425 A1 * | 6/2019 | B60H 1/00521 |
| DE | 102018122226 A1 | 3/2020 | |
| DE | 102020117193 B3 | 11/2021 | |
| DE | 102017223425 B4 | 2/2023 | |

* cited by examiner

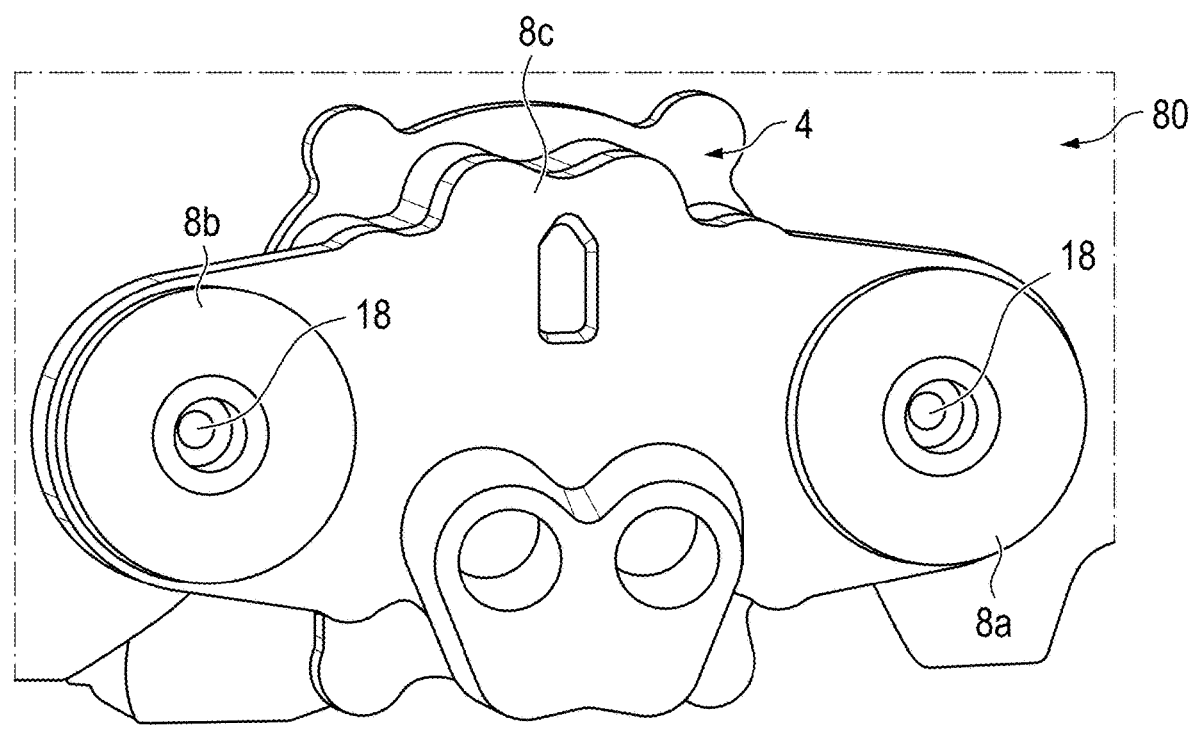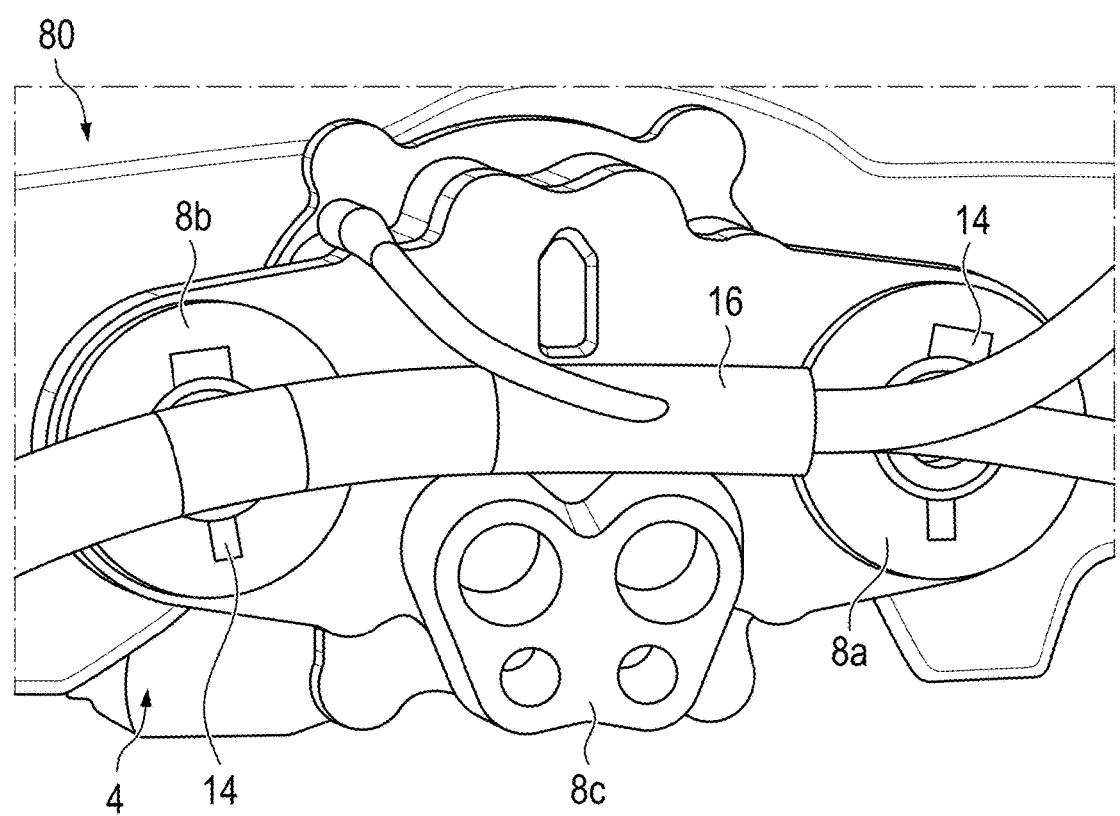
Fig. 6

MOTOR-PUMP UNIT FOR USE IN A MOTOR VEHICLE

CROSS-REFERENCE TO RELATED APPLICATION

This application claims priority to German Patent Application No. 10 2023 122 138.8, filed Aug. 18, 2023, the content of such application being incorporated by reference herein in its entirety.

FIELD OF THE INVENTION

The present invention relates to a motor-pump unit for use in a motor vehicle and to an axle carrier with such a motor-pump unit. Furthermore, the invention relates to a motor vehicle with such a motor-pump unit or such an axle carrier.

SUMMARY OF THE INVENTION

Motor-pump units for use in a motor vehicle are known from the prior art. A motor-pump unit is usually used to generate hydraulic energy and use it for various applications in a vehicle. Common motor-pump units comprise in particular a hydraulic pump, which is mounted or fastened via bearing elements within a motor vehicle, e.g. on an axle carrier of a motor vehicle.

The disadvantage is that it is difficult to fasten or mount a motor-pump unit inside a motor vehicle, as there is only limited installation space available and reliable fastening is essential for safety reasons. In addition, the correct alignment of a motor-pump unit during fastening has proven to be time-consuming.

It is therefore the object of the present invention to at least partially remedy the disadvantages described above, in particular it is the object of the present invention to provide a motor-pump unit for use in a motor vehicle which can be manufactured in a simple and inexpensive manner and which can be fastened in a motor vehicle in a simple, inexpensive and at the same time reliable manner.

The above problem is solved by a motor-pump unit having the features of claim 1, an axle carrier according to claim 9 and a motor vehicle according to claim 10. Further features and details arise from the dependent claims, the description, and the drawings. Technical features disclosed for the motor-pump unit according to aspects of the invention also apply in connection with the axle carrier according to aspects of the invention or the motor vehicle according to aspects of the invention and vice versa, so that reference is or can always be made reciprocally with regard to the disclosure of the individual aspects of the invention. Expedient configurations of the invention are given in the dependent claims.

According to aspects of the invention, a motor-pump unit is provided for use in a motor vehicle. The motor-pump unit according to aspects of the invention comprises a hydraulic pump for generating hydraulic pressure for driving hydraulic systems, a bearing tube for mounting the motor-pump unit within the motor vehicle and at least one retainer for fastening the motor-pump unit to an axle carrier of the motor vehicle, wherein the retainer is arranged at the end of the hydraulic pump.

According to aspects of the invention, a motor-pump unit is thus provided for use in a motor vehicle, in which, by means of the arrangement of a bearing tube for mounting the motor-pump unit within the motor vehicle and by means of the arrangement of at least one retainer for fastening the motor-pump unit to an axle carrier of the motor vehicle, which is arranged at the end of the hydraulic pump, both a simple and inexpensive manufacture of a motor-pump unit and a simple, inexpensive and at the same time reliable fastening of the motor-pump unit within a motor vehicle are ensured.

The motor-pump unit in question can preferably be used in a motor vehicle, such as a passenger vehicle or a truck. However, the use in other vehicles, such as commercial vehicles, ships, or airplanes, is likewise conceivable.

With a view to simple and reliable fixing of a motor-pump unit within a motor vehicle, it may advantageously be provided according to aspects of the invention that the at least one retainer is of spectacle-shaped design, wherein the retainer preferably has a first and second circular retaining element and a retaining base arranged between the first and second circular retaining element.

In order to effectively reduce vibrations and shocks generated by the operation of the motor of a motor-pump unit and other components, it may advantageously be provided according to aspects of the invention that the at least one retainer has decoupling elements for decoupling vibrations. The decoupling elements can, for example, be designed as bearings, preferably rubber bearings, as spring elements, as damping materials or hydraulic dampers or the like.

With regard to a particularly compact arrangement of the motor-pump unit according to aspects of the invention in a motor vehicle, it can also be advantageous if the at least one retainer is integrated into the hydraulic pump, preferably arranged at least partially inside the cover of the hydraulic pump.

In the context of a particularly compact arrangement of the motor-pump unit according to aspects of the invention in a motor vehicle, it can also be advantageous if a tie rod is provided for fastening the bearing tube to the hydraulic pump. By fastening a bearing tube via a tie rod, it is also possible to fasten a bearing tube to a hydraulic pump in a structurally simple and reliable manner, so that no protruding flange geometry is required for fastening.

To ensure a particularly flexible arrangement of a motor-pump unit within a motor vehicle, it may also be provided in the present case that a first and a second retainer are provided, wherein the first retainer is preferably integrated into the hydraulic pump and the second retainer is arranged at the end of the bearing tube, wherein the second retainer is designed so that its position can be varied in particular via the bearing tube. In such an arrangement, for example, the distance between the retainers can be adjusted by modifying the length of the bearing tube. Any rotational positioning of the retainer on the bearing tube before screwing can be used to realize any angular position of the retainers in relation to each other. In the present case, this preferably enables simple adaptation to the various package requirements of various axle assemblies in which the motor-pump unit in question can be installed.

With regard to a simple, convenient and flexible arrangement of the motor-pump unit on an axle carrier of a motor vehicle, it can advantageously be provided according to aspects of the invention that a shaped piece is provided which is arranged at the end of the bearing tube, wherein the shaped piece is preferably designed in the form of a bearing pin for insertion into a rubber bearing of a side part of an axle carrier. In this way, a simple 3-point mounting can be constructed. It is understood that instead of the arrangement of the motor-pump unit in an axle carrier, the arrangement can be provided in another retainer. Such an arrangement also promises a low installation space requirement and low weight, as a motor-pump unit can be mounted directly in an axle component using only a rubber bearing (if necessary without an additional retainer). In addition, no rotational positioning of the retainers in relation to each other is required when two retainers are arranged.

In order to realize an axially fixed, stable and space-saving cable fixation on the motor-pump unit, it can advantageously be provided that at least one cable fixation element is provided for fastening a cable, wherein the cable fixation element is preferably arranged within the first or second circular retaining element, in particular is fixed via bearing bushes with internal threads within the first or second circular retaining element. The cable fixings can preferably be in the form of clip connections, which, for example, cling to the bearing bushes. This arrangement also requires no modification to the pump cover, such as protruding cast contours, and reliably prevents a cable from vibrating.

Another object of the invention is an axle carrier for use in a motor vehicle, having a motor-pump unit as described above, wherein the motor-pump unit is fastened to the axle carrier via the at least one retainer, preferably via a first and second retainer. The axle carrier according to aspects of the invention thus has the same advantages as those already described in detail in relation to the motor-pump unit according to aspects of the invention. Preferably, the motor-pump unit is mounted on the axle carrier such that the retainer or retainers grip around the counter-retainers integrated into the side parts of the axle carrier from the outside. The retainer or retainers can, for example, be bolted to the axle carrier from the outside via sleeves in decoupling elements.

Another object of the invention is a motor vehicle comprising a motor-pump unit as described above, preferably comprising an axle carrier as described above. The motor vehicle according to aspects of the invention thus has the same advantages as those already described in detail in relation to the motor-pump unit or the axle carrier according to aspects of the invention.

Further advantages, features, and details of the invention arise from the following description, in which example embodiments of the invention are described in detail with reference to the drawings. The features mentioned in the claims and in the description can be essential to the invention individually or in any combination.

BRIEF DESCRIPTION OF THE DRAWINGS

The following are shown schematically:

FIG. 6 is an enlarged view of a part of the motor-pump unit according to aspects of the invention without (top) and with (bottom) a fixing of a cable via cable fixing elements.

DETAILED DESCRIPTION OF THE INVENTION

Figure 1:
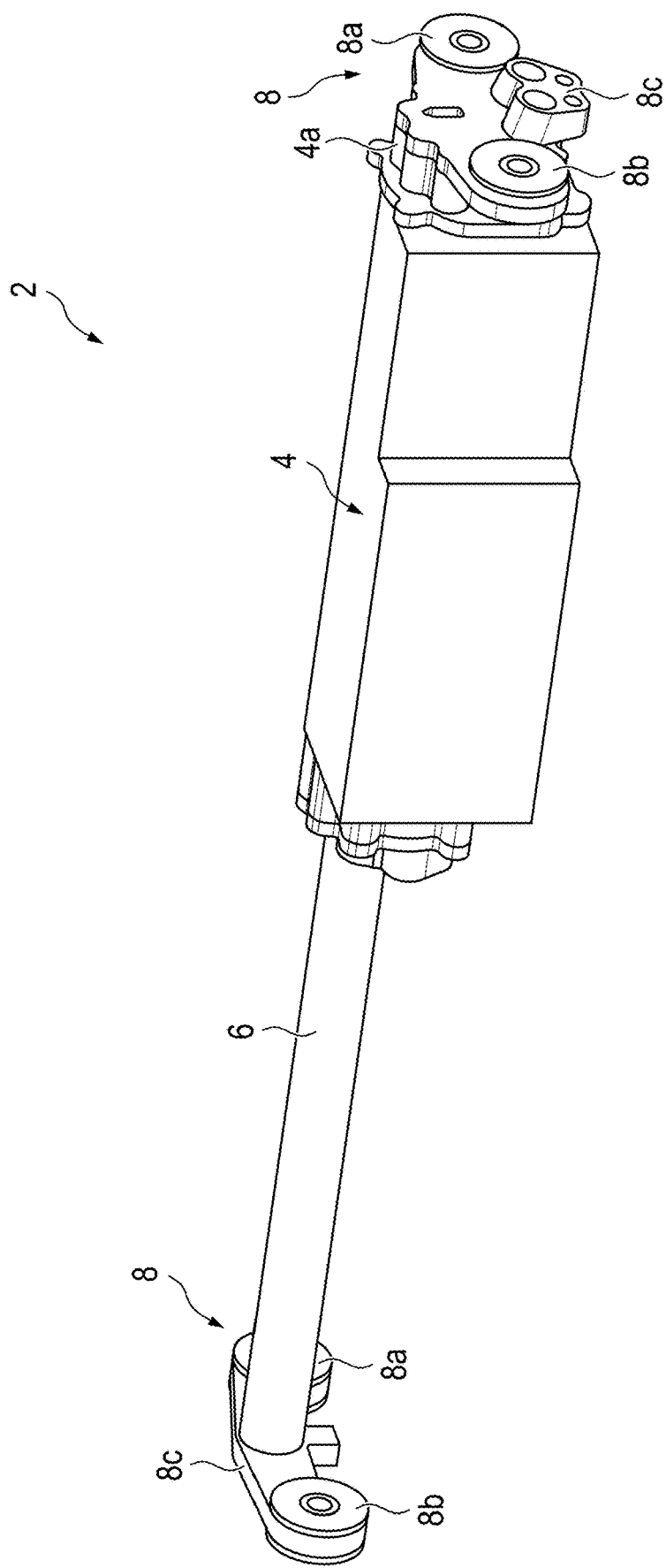
FIG. 1 is a first view of a motor-pump unit according to aspects of the invention for use in a motor vehicle according to a first example embodiment.

FIG. 1 shows a motor-pump unit 2 according to aspects of the invention for use in a motor vehicle according to a first example embodiment in a first view.

As can be seen in FIG. 1, the motor-pump unit 2 comprises a hydraulic pump 4 for generating hydraulic pressure for driving hydraulic systems, a bearing tube 6 for mounting the motor-pump unit 2 within the motor vehicle and a first and second retainer 8 for fastening the motor-pump unit 2 to an axle carrier 80 of the motor vehicle, wherein the first retainer 8 is arranged at the end on the hydraulic pump 4 and the second retainer 8 is arranged at the end on the bearing tube 6.

The retainers 8 are spectacle-shaped and have a first and second circular retaining element 8a, 8b and a retaining base 8c arranged between the first and second circular retaining element 8a, 8b.

The retainers 8 preferably have decoupling elements to decouple vibrations.

As can be seen in the figure, the retainer 8 is arranged on the right-hand side at least partially inside the cover 4a of the hydraulic pump 4.

Figure 2:
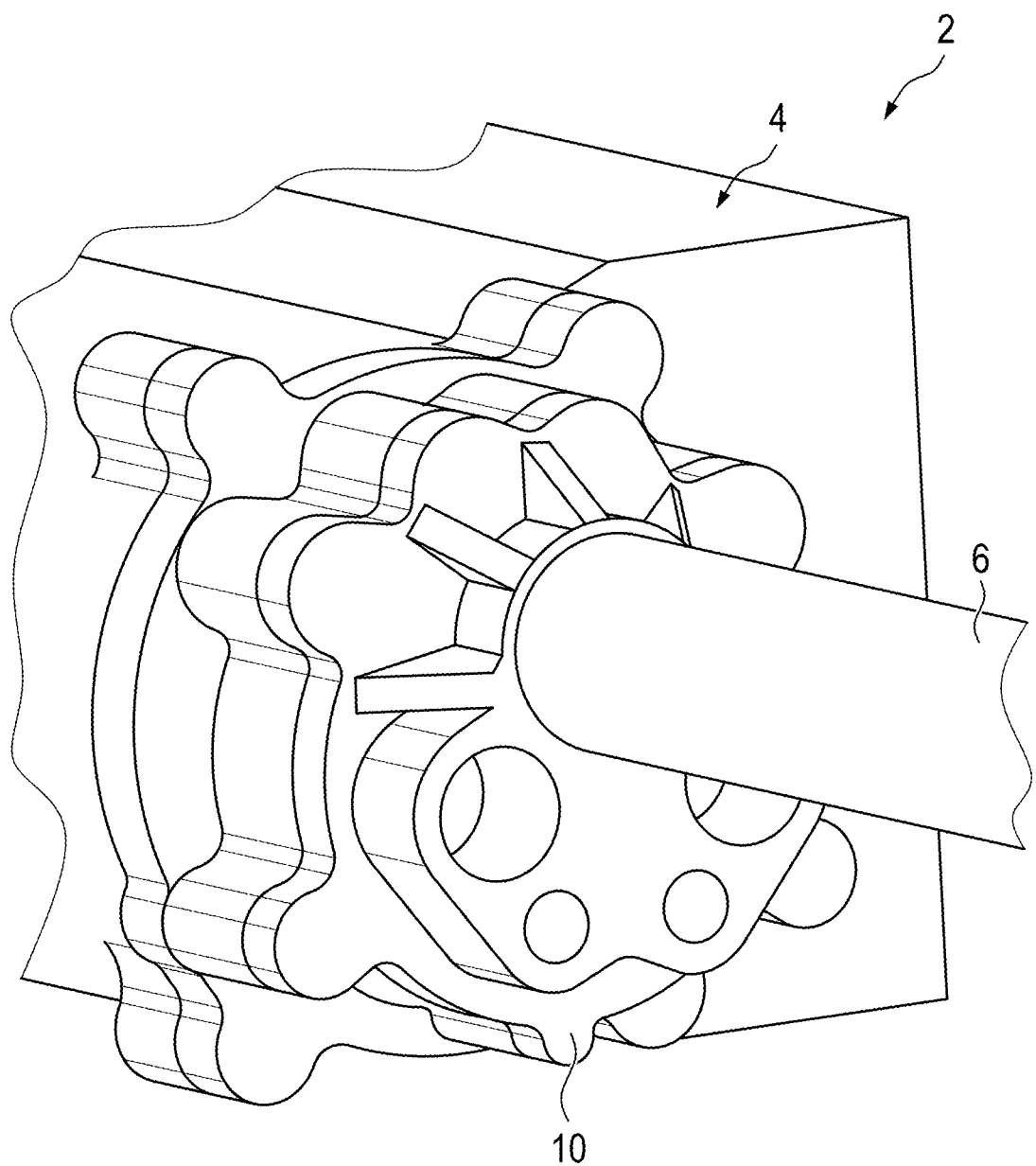
FIG. 2 is a second enlarged view of the motor-pump unit according to aspects of the invention as shown in FIG. 1.

FIG. 2 shows the motor-pump unit 2 according to aspects of the invention as shown in FIG. 1 in a second enlarged view.

As can be seen in FIG. 2, the motor-pump unit 2 has a tie rod 10 for fastening the bearing tube 6 to the hydraulic pump 4.

Figure 3:
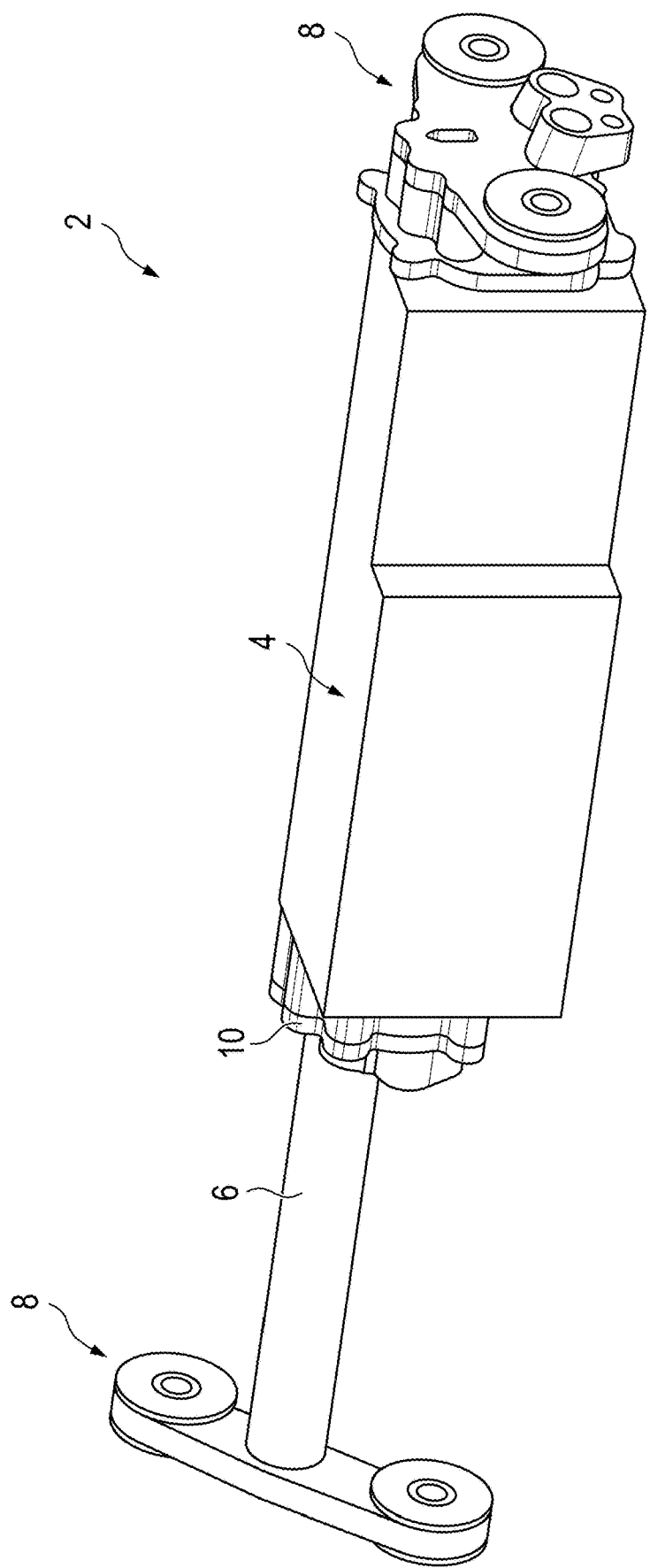
FIG. 3 is a third view of the motor-pump unit according to aspects of the invention as shown in FIG. 1.

FIG. 3 shows a third view of the motor-pump unit 2 according to aspects of the invention as shown in FIG. 1.

As can be seen in the view in FIG. 3, the first retainer 8 is integrated into the hydraulic pump 4 and the second retainer 8 is arranged at the end of the bearing tube 6 and can be varied in its position via the bearing tube 6, which in particular enables simplified alignment of the motor-pump unit 2 within a motor vehicle.

Figure 4:
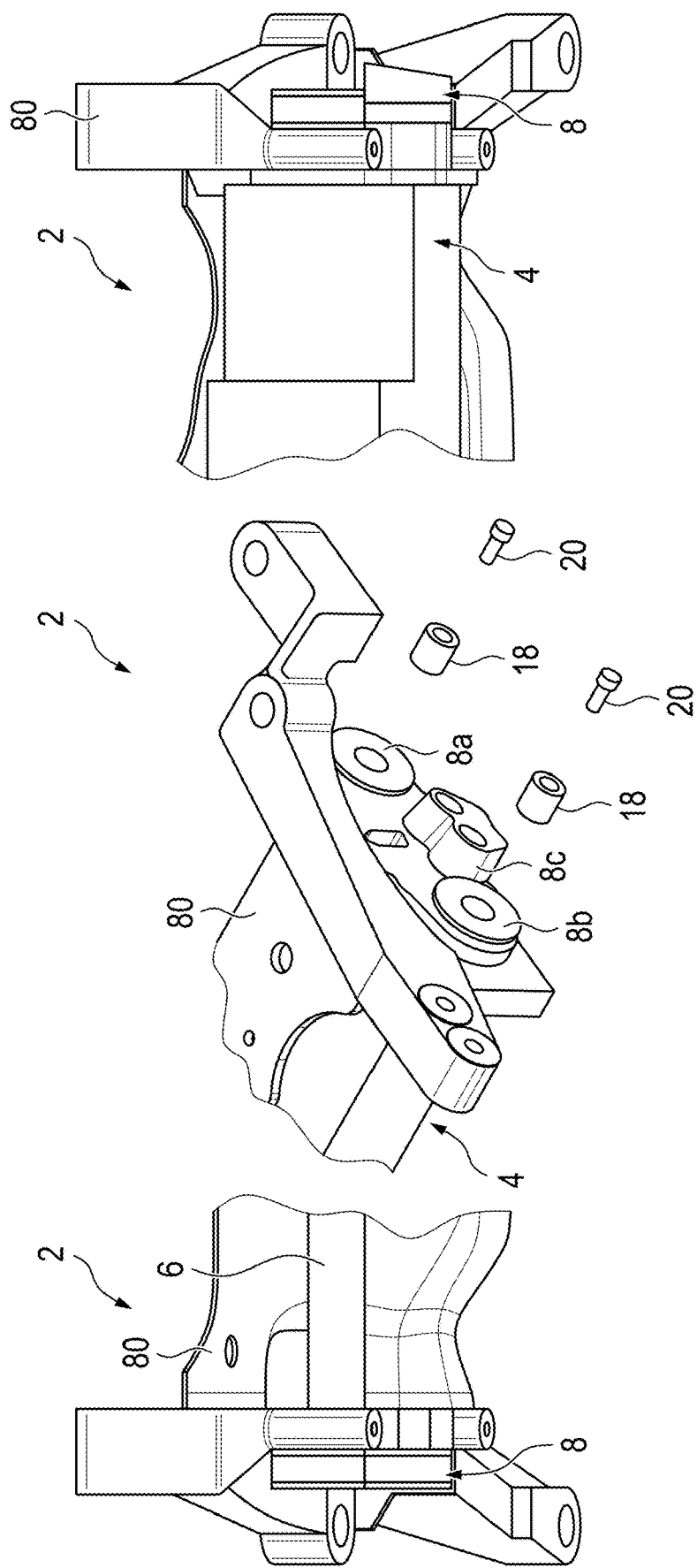
FIG. 4 depicts an axle carrier according to aspects of the invention with a motor-pump unit for use in a motor vehicle from three different views (left, center, right)

FIG. 4 shows an axle carrier 80 according to aspects of the invention with a motor-pump unit 2 for use in a motor vehicle from three different views (left, center, right).

As can be seen in FIG. 4, the motor-pump unit 2 is fastened to the axle carrier 80 via at least one retainer 8, in this case via bearing bushes 18, which are inserted into the first and second circular retaining elements 8a, 8b and are fixed in place via screws 20.

Figure 5:
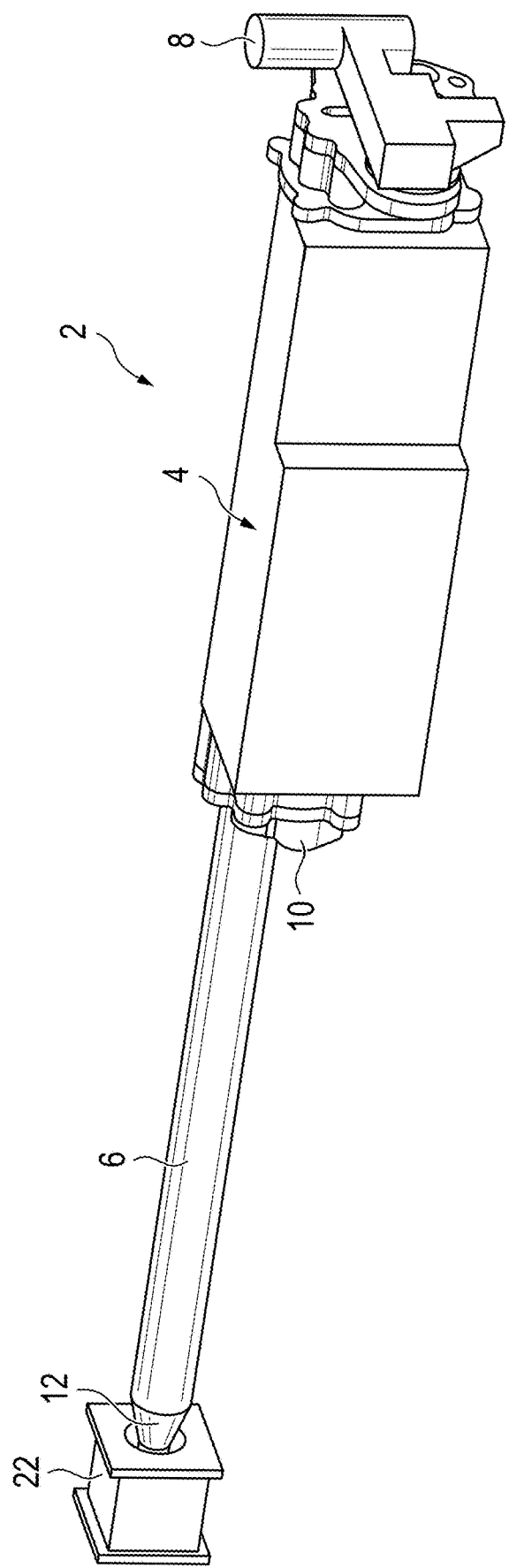
FIG. 5 is a first view of a motor-pump unit according to aspects of the invention for use in a motor vehicle according to a second example embodiment.

FIG. 5 shows a motor-pump unit 2 according to aspects of the invention for use in a motor vehicle according to a second example embodiment in a first view.

As can be seen from FIG. 5, according to the second example embodiment of the motor-pump unit 2 according to aspects of the invention, a shaped piece 12 is provided which is arranged at the end of the bearing tube 6, wherein the shaped piece 12 is designed in the form of a bearing pin for insertion into a rubber bearing 22 of a side part of an axle carrier 80.

FIG. 6 shows an enlarged view of a part of the motor-pump unit 2 according to aspects of the invention without (top) and with (bottom) a fixing of a cable 16 via cable fixing elements 14.

As can be seen in FIG. 6, the cable fixing elements 14 are arranged within the first or second circular retaining element 8a, 8b and are fixed via bearing bushes 18 with internal threads within the first and second circular retaining elements 8a, 8b.

The above explanation of the embodiments describes the present invention solely in the context of examples. Of course, individual features of the embodiments can be freely combined with one another insofar as they are technically advantageous without leaving the scope of the present invention.

What is claimed is:

1. An axle assembly for use in a motor vehicle, said axle assembly comprising:
    an axle; and
    a motor-pump unit comprising:
        a hydraulic pump for generating hydraulic pressure to drive hydraulic systems,
        a bearing tube for mounting the motor-pump unit inside of the motor vehicle, and
        at least one retainer for fastening the motor-pump unit to the axle of the motor vehicle,
        wherein the at least one retainer is arranged at the end of the hydraulic pump wherein the axle comprises a bracket that is sandwiched between the retainer and the hydraulic pump and is secured to the hydraulic pump by fasteners.

2. The axle assembly according to claim 1, wherein the at least one retainer has a spectacle-shape, wherein the retainer has a first circular retaining element, a second circular retaining element and a retaining base arranged between the first and second circular retaining elements.

3. The axle assembly according to claim 2, further comprising at least one cable fixing element for fastening a cable, wherein the cable fixing element is (i) arranged within the first or second circular retaining element, and (ii) fixed via bearing bushes with internal threads within the first or second circular retaining elements.

4. The axle assembly according to claim 1, wherein the at least one retainer is integrated into the hydraulic pump and arranged at least partially inside of a cover of the hydraulic pump.

5. The axle assembly according to claim 1, wherein the bearing tube is fastened to the hydraulic pump by a tie rod.

6. The axle assembly according to claim 1, wherein the at least one retainer comprises a first retainer and a second retainer, wherein the first retainer is integrated into the hydraulic pump and the second retainer is arranged at the end of the bearing tube, wherein the second retainer is configured such that a position of the second retainer can be varied via the bearing tube.

7. The axle assembly according to claim 1, further comprising a shaped piece arranged at an end of the bearing tube, wherein the shaped piece comprises a bearing pin that is configured to be inserted into a rubber bearing of a side part of an axle.

8. The axle assembly according to claim 1, wherein the at least one retainer has decoupling elements for decoupling vibrations.

9. The axle assembly according to claim 1, wherein the at least one retainer comprises a first retainer and a second retainer, and wherein the motor-pump unit is fastened to the axle via the first and second retainers.

10. A motor vehicle comprising the axle assembly according to claim 1.

11. The axle assembly according to claim 1, wherein the at least one retainer has a spectacle-shape, wherein the retainer has a first circular retaining element, a second circular retaining element and a retaining base arranged between the first and second circular retaining elements, and wherein the bracket is mounted at least partially over the retainer and the hydraulic pump.

12. The axle assembly according to claim 1, wherein the hydraulic pump has a first side to which the bearing tube is mounted and a second side opposite the first side to which the retainer is mounted.

13. The axle assembly according to claim 12, wherein the bearing tube has a first end that is mounted to the hydraulic pump by a tie rod, and a second end opposite the first end, wherein a second retainer is mounted to the second end, and wherein the second retainer is configured to be mounted to a point on the motor vehicle.

14. The axle assembly according to claim 13, wherein the second retainer is rotatably mounted to the second end of the bearing tube.

15. The axle assembly according to claim 14, wherein the second retainer has a spectacle-shape, wherein the second retainer has a first circular retaining element and a second circular retaining element, and wherein the second retainer is rotatable for aligning the first and second circular retaining elements with mounting points on the vehicle.

* * * * *